United States Patent [19]

Shaw et al.

[11] Patent Number: 4,872,481
[45] Date of Patent: Oct. 10, 1989

[54] POPPET VALVE FLOW SEAT

[75] Inventors: Richard E. Shaw, Inman; Steven R. Wolverton, Simpsonville, both of S.C.

[73] Assignee: Cooper Industries, Inc., Houston, Tex.

[21] Appl. No.: 873,862

[22] Filed: Jun. 12, 1986

Related U.S. Application Data

[63] Continuation of Ser. No. 710,715, Mar. 12, 1985, abandoned.

[51] Int. Cl.$^4$ ............................................. F16K 15/00
[52] U.S. Cl. ............................. 137/543.17; 137/512.1; 137/543.13; 251/359
[58] Field of Search .............................. 251/333, 359; 137/512.1, 540, 543.13, 543.17

[56] References Cited

U.S. PATENT DOCUMENTS

| | | | |
|---|---|---|---|
| 1,691,449 | 11/1928 | Sharp | 137/543.19 |
| 2,504,470 | 4/1950 | Trautman | 137/540 |
| 2,624,587 | 1/1953 | Watson et al. | 137/543.17 |
| 3,701,361 | 9/1972 | Bunn et al. | 137/543.23 |
| 4,036,251 | 7/1977 | Hartwick et al. | 137/512.1 |
| 4,228,820 | 9/1980 | Deminski | 137/514.3 |
| 4,489,752 | 12/1984 | Deminski | 137/512.1 |
| 4,526,195 | 7/1985 | Humphrey et al. | 137/512.1 |

FOREIGN PATENT DOCUMENTS

| | | | |
|---|---|---|---|
| 926361 | 5/1973 | Canada | 137/512.1 |
| 2071818 | 9/1981 | United Kingdom | 137/512.1 |

OTHER PUBLICATIONS

"Experimental Investigation of Pressure Drop in Valve Parts and Conduits of Hermetic Compressor" by A. W. Palzuski, Proceeding of 1982 Purdue Compressor Technology Conference, pp. 26-31.

Primary Examiner—Noah P. Kamen
Attorney, Agent, or Firm—Finnegan, Henderson, Farabow, Garrett & Dunner

[57] ABSTRACT

The edges of the port exits of a poppet valve seat member are each provided with a 30 degree chamfer and a counter-bore immediately upstream of the chamfer to significantly reduce exit flow losses. The depth/width of the counter-bore is between about 2:1 and about 3:1.

12 Claims, 3 Drawing Sheets

POPPET VALVE FLOW SEAT

This application is a continuation of application Ser. No. 710,715 filed Mar. 12, 1985, now abandoned.

BACKGROUND OF THE INVENTION

Field of the Invention

This invention relates to improved flow seats for poppet valve assemblies, and particularly to flow seats having port exit constructions exhibiting reduced flow losses.

Description of the Prior Art

Valve assemblies using poppets movable alternately, into, and out of, engagement with the exit of a fluid port for controlling fluid flow are well known in the art. See e.g. U.S. Pat. No. 4,228,820. Examples of the use of such poppet valve assemblies are in gas compressors where, in larger models, the poppet valve assembly can include a number of separate poppet valves operating in parallel in the same valve assembly.

As in other types of check valves, poppet valve assemblies can introduce unwanted, unrecoverable pressure drops along the fluid path which can result in undesireable flow throttling and reduce compressor overall efficiency. These unrecoverable pressure drops stem not only from the frictional losses in the component but also from the form losses caused by abrupt expansions or contractions in the component cross-sectional flow area. Eddy formations and other hydrodynamic processes at these flow area changes can result in the unwanted conversion of kinetic energy of the flowing fluid to heat energy which cannot be recovered as PV energy in a diffuser and thus represent a loss in compressor efficiency.

It is a fundamental object of the present invention to reduce the energy losses at the port exit region of the flow seat. Additional objects and advantages of the invention will be set forth in part in the description which follows, and in part will be obvious from the description, or may be learned by practice of the invention.

SUMMARY OF THE INVENTION

In accordance with the present invention as embodied and broadly described herein, the improved poppet valve seat assembly includes a seat member having a surface with at least one port having an exit forming an edge with the adjacent portion of the surface, the seat assembly for use with a poppet movable into, and out of, engagement with the seat member for sealing, and unsealing, the port exit, respectively, and means for reducing the pressure losses incurred by fluid flowing out of the port exit past the port exit edge. Specifically, the loss reducing means includes a chamfer formed at the edge of the port exit and a counter-bore formed in the port exit edge upstream of the chamfer with respect to the flow direction through the port.

Preferably, the counter-bore has a characteristic depth "D" measured axially from the chamfer and a characteristic width "W" measured radially from the wall of the port, and the ratio D/W is between about 2:1 and about 3:1. It is also preferred that the angle of the chamfer with respect to the seat member surface is about 30 degrees.

And it is still further preferred that a poppet valve assembly for gas compressors using the aforementioned improved poppet valve seat assembly additionally includes a poppet guard member disposed adjacent the seat member surface, and a plurality of poppets each mounted in the guard member for movement into and out of engagement with a respective port, each of the poppets having a conical sealing face.

The accompanying drawings which are incorporated in and constitute a part of this specification, illustrate one embodiment of the invention and, together with the description, serve to explain the principles of the invention.

DESCRIPTION OF THE PREFERRED EMBODIMENT

Figure 1:
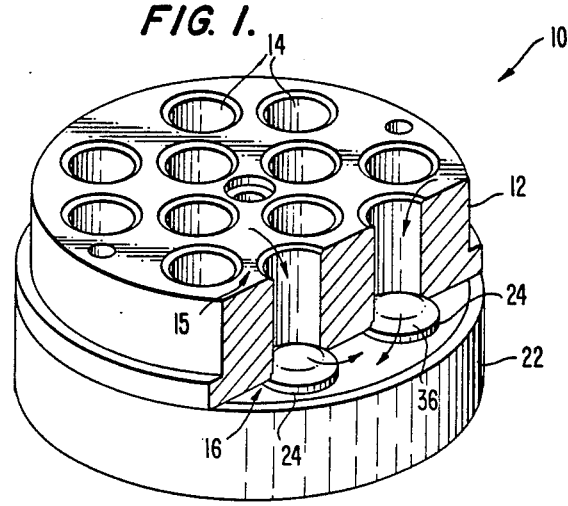
FIG. 1 is a schematic, cut away perspective view of the improved poppet valve assembly made in accordance with the present invention.

Reference will now be made to a preferred embodiment of the present invention, examples of which are illustrated in the drawings.

Figure 2:
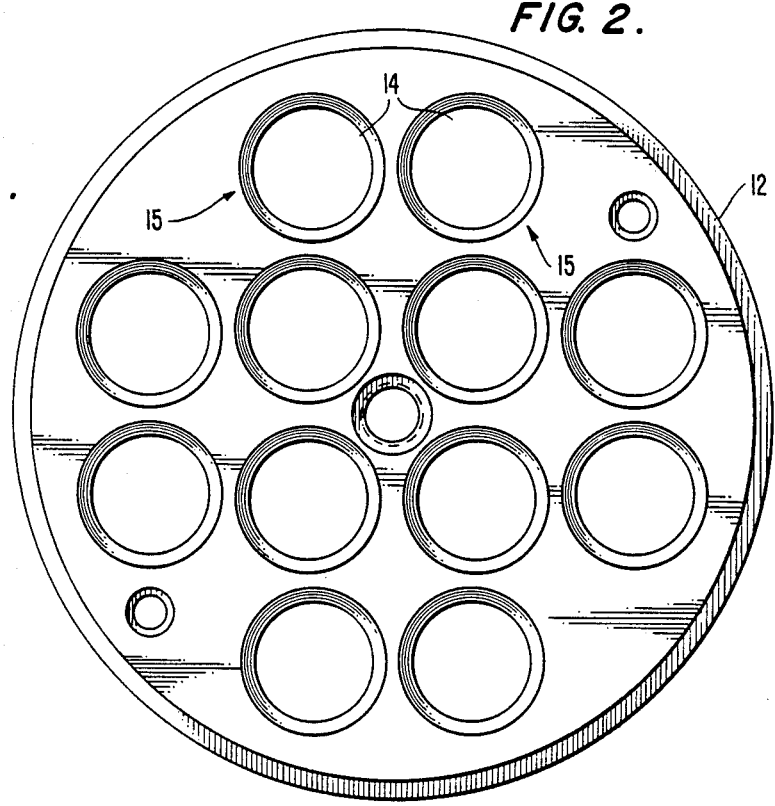
FIG. 2 is a plan view of the seating member component of the poppet valve assembly shown in FIG. 1.
Figure 3:
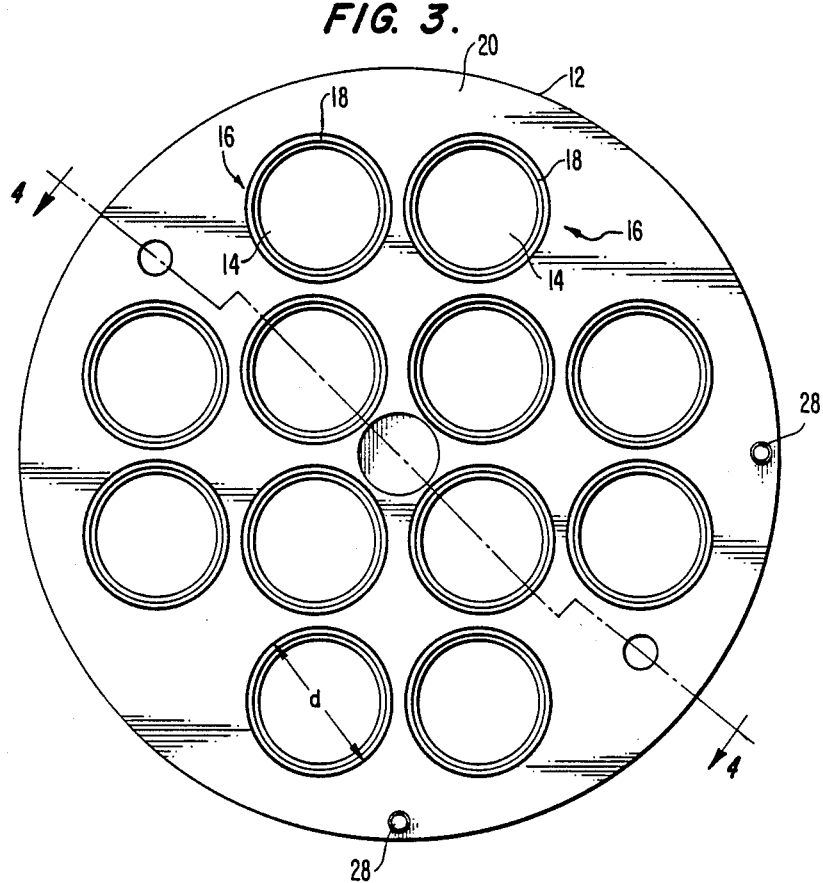
FIG. 3 is the bottom view of the seating member component of the poppet valve assembly shown in FIG. 1.

A poppet valve assembly made in accordance with the present invention is shown schematically in FIG. 1 and is designated generally by the numeral 10. Poppet valve assembly 10 can be advantageously used in a gas compressor, but the present invention is not restricted to apparatus for use in gas compressors or for use with a gas-type fluid. Poppet valve assembly 10 includes seating member 12 having a plurality of cylindrical, parallel through-ports 14 distributed across the member. As best seen in FIGS. 2 and 3, each of ports 14 includes an inlet portion 15 and an exit portion 16. Specifically, exit portions 16 form edge areas 18 with the immediately adjacent parts of seating member lower surface 20.

Figure 5:
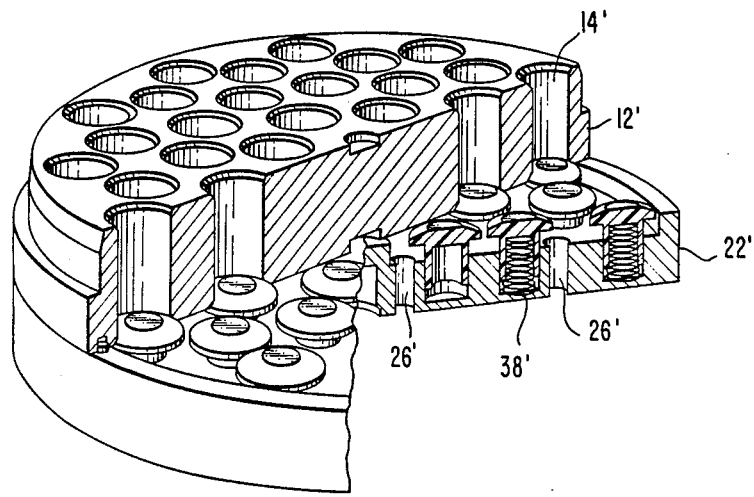
FIG. 5 is a sectional view of a variation of the embodiment shown in FIG. 1.

Poppet valve assembly 10 also includes poppet guard member 22 disposed adjacent to surface 20 of seat member 12. A plurality of individual poppets 24 are carried by guard member 22 to be movable into and out of engagement with respective ports 14 for alternately sealing and unsealing ports exits 16. A plurality of through-bores (not shown in FIG. 1) are provided in guard member 22 to channel fluid exiting ports 14 past poppets 24 and guard member 22. See FIG. 5 showing a cut away of guard member 22' where through-bores 26' are depicted.

Referring again to FIG. 1, the intended flow path past poppet valve assembly 12 when poppets 24 are in the retracted, unsealing position (they are shown in the sealing position in FIG. 1) is indicated generally by the double arrows. Although the embodiment depicted in FIG. 1 shows a total of 12 ports distributed in a particular fashion, the present invention is not restricted to this number or to the particular arangement shown. FIG. 5 depicts a variation having a larger number of ports 14'. Also, ports 14 may be of different cross sectional shape, and it is understood that the shape of the sealing face of poppet members 14 will correspond to the shape of the port exit. Similarly, various means can be utilized for insuring alignment of the poppets 24 with a corresponding port exit 16. In the embodiment shown in FIGS. 1-4, a pair of dowel pins 28 (see FIG. 3) are provided in sealing member 12 to engage corresponding pilot holes (not shown) in guard member 22 to provide such alignment.

Figure 4:
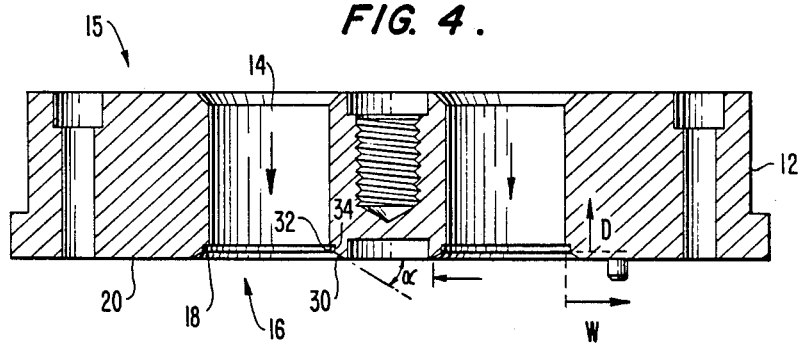
FIG. 4 is a sectional view taken at the lines 4 of the seating member component shown in FIG. 3.

In accordance with the present invention, means are provided for reducing energy losses incurred by fluid flowing out of the port exits. Specifically, the loss reducing means includes a chamfer formed in each of the port exit edges. As embodied herein and as best seen in FIG. 4, edge 18 has chamfer portion 30 formed at an angle alpha with the seating member surface 20. Preferably, angle alpha is about 30 degrees.

Figure 6:
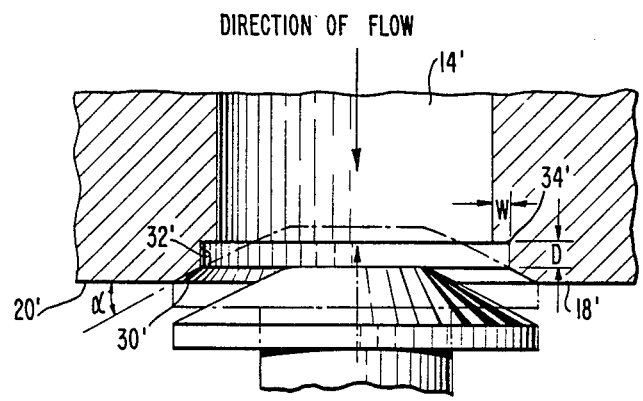
FIG. 6 is a detail through the port exit region of the poppet value assembly in FIG. 5.

Also in accordance with the present invention, the loss reducing means includes a counter-bore formed in the port exit edge immediately upstream of the chamfer in respect to the fluid flow direction. As embodied herein and with continued reference to FIG. 4, counter bore 32 is formed in edge 18 upstream and immediately adjacent chamfer 30 with respect to the fluid flow direction in port 14 as designated by the double arrows. Preferably, counter-bore 32 is of the sharp-corner type with the internal corner 34 having a maximum radius of less than about 1/64 inch. These same features are depicted in FIG. 6 in an enlarged view of the port exit edge of the FIG. 5 poppet value assembly, with corresponding ports being designed with like reference numerals but with a prime superscript.

It has been found that the degree to which the energy losses can be reduced by the combination of the chamfer and upstream counter-bore in the present invention is strongly dependent upon the ratio of the counter-bore characteristic depth "D" divided by the counter-bore characteristic width "W". As used herein and as best shown in FIG. 6, the counter-bore characteristic depth "D" is defined as the axial distance along port 14' occupied by counter-bore 32' exclusive of the depth of chamfer 30'. The characteristic counter-bore width "W" is defined as the radial distance measured from the wall of port 14'.

It is highly preferred that the dimensions of the counter-bore be such that the D/W ratio lie between about 2:1 and about 3:1. Test results have shown that a more than 24% improvement (decrease) in the port exit resistance factor can be achieved using counter-bores having a D/W ratio in the 2:1-3:1 range, compared to a slightly less than 7% resistance factor decrease for a counter-bore with a D/W ratio of about 1:1.

An example of the improved poppet valve assembly depicted in the figures was constructed using 1141 steel for the seating member 12 and guard member 22. Poppets 24 were injection molded glass-filled nylon and were slidingly mounted in guard member 22 biased to the sealing position with variable rate 17-7 PH steel springs (not shown in FIG. 1, but see springs 38 in the FIG. 5 embodiment). The nominal diameter of the individual ports 14 was 1 and 1/16 inch, and a 30 degree chamfer was used extending to a maximum diameter of about 1.28 inches (see representation of the maximum chamfer diameter d in FIG. 3). Each port exit had a counter-bore with a characteristic depth D of about 1/16 inch and a characteristic width W of about 1/32 inch, yielding a D/W ratio of about 2:1. Also, the poppets each had conical sealing faces (see faces 36 in FIG. 1) with a 30 degree slope to provide good conformity (and thus sealing) with chamfer 30 on port exit edge 18.

It will be apparent to those skilled in the art that various modifications and variations can be made in the poppet valve assemblies of the present invention. Thus, it is intended that the present invention cover the modifications and variations of this invention provided they come within the scope of the appended claims and their equivalents.

What is claimed is:

1. In a poppet valve seat assembly including a seat member having a surface with at least one port, the port having an exit forming an edge with the adjacent portion of the surface, the seat assembly for use with a poppet movable into, and out of, engagement with the seat member for sealing, and unsealing, the port exit, respectively, the improvement comprising:
   (i) a chamfer formed at the edge of the port exit; and
   (ii) a counter-bore formed in the port exit edge immediately upstream of said chamfer with respect to the flow direction through the port.

2. The improved seat assembly as in claim 1 wherein said counter-bore has a characteristic depth "D" measured axially from said chamfer and a characteristic width "W" measured radially from the wall of the port, and wherein the ratio D/W is between about 2:1 and about 3:1.

3. The improved seat assembly as in claim 1 wherein the angle of said chamfer with respect to the seat member surface is about 30 degrees.

4. The improved seat assembly as in claim 1 wherein the corner of said counter-bore has a radius of less than about 1/64 inch.

5. The improved seat assembly as in claim 1 wherein the width of said counter-bore is about 1/32 inch.

6. The improved seat assembly as in claim 2 wherein the width of said counter-bore is about 1/32 inch.

7. The improved seat assembly as in claim 1 wherein the depth of said counter-bore is about 1/16 inch and the width of said counter-bore is about 1/32 inch.

8. The improved seat assembly as in claim 1 wherein the port is cylindrical having a nominal diameter of about 1 and 1/16 inch, and the counter-bore depth and width are about 1/16 inch and 1/32 inch, respectively.

9. The improved seat assembly as in claim 8 wherein the maximum diameter of said chamfer is about 1.28 inch.

10. In a poppet valve seat assembly including a seat member having a surface with a plurality of ports distributed about the surface, each port having an exit forming a circular edge with the adjacent portion of the seat member surface, the seat assembly for use with a plurality of poppets each moveable into, and out of, engagement with the seat member for respectively sealing and unsealing the exit of a corresponding one of the ports, the improvement comprising:
   a chamfer formed at the exit edge of each said port; and a counter-bore formed at each said port exit immediately upstream of said chamfer with respect to the flow direction through the port, said counter-bore cooperating with said chamfer to reduce the pressure loss caused by flow out of the port past the port exit edge,
   said chamfer having an angle of about 30 degrees with respect to the seat member surface, and said counter-bore having a characteristic depth "D" measured axially from said chamfer and a characteristic width "W" measured radially from the wall of the port, and the ratio D/W being between about 2:1 and about 3:1.

11. The improved seat assembly as in claim 10 wherein, for each port:
   the nominal diameter is about 1 and 1/16 inch,
   the depth and width of each port exit edge counterbore are about 1/16 inch and 1/32 inch, respectively, and
   the maximum diameter of said chamfer is about 1.28 inch.

12. An improved poppet valve assembly for gas compressors comprising:
   the improved poppet valve seat assembly as in claim 10;
   a poppet guard member disposed adjacent the seat member surface; and
   a plurality of poppets each mounted in said guard member for movement into and out of engagement with a respective port, each of said poppets having a conical sealing face with a 30 degree slope, relative to the seat member surface.

* * * * *